United States Patent [19]

Fridhandler

[11] Patent Number: 5,167,002

[45] Date of Patent: Nov. 24, 1992

[54] ELECTRIC MOTOR DRIVER CONTROL

[76] Inventor: Robert M. Fridhandler, 2 Sylvanus Ct., Blauvelt, N.Y. 10913

[21] Appl. No.: 744,993

[22] Filed: Aug. 14, 1991

[51] Int. Cl.$^5$ .......................................... G06F 15/332
[52] U.S. Cl. ................................. 388/815; 388/902; 388/906; 364/827; 364/726
[58] Field of Search .................. 388/800, 809–815, 388/902, 906; 364/726, 822, 827, 474.15

[56] References Cited

U.S. PATENT DOCUMENTS

| | | |
|---|---|---|
| 3,896,356 | 7/1975 | Hoffman et al. |
| 4,527,101 | 7/1985 | Zavis et al. ........... 388/809 X |
| 4,739,230 | 4/1988 | Sonobe et al. |
| 4,791,575 | 12/1988 | Watts et al. ........... 318/569 X |
| 4,992,711 | 2/1991 | Sugita et al. ........... 318/572 X |

OTHER PUBLICATIONS

Y. P. Gagnon, "Low-Frequency Vibration Analysis of Paper Machine Presses Using Displacement Transducers and the Synchronous Time-Averaging Method", *Tappi Journal*, Jul. 1987.

E. A. Page, "Vibration Analysis Pinpoints Gear Defects", *Power Transmission Design*, Mar. 1989.

Primary Examiner—William M. Shoop, Jr.
Assistant Examiner—David Martin
Attorney, Agent, or Firm—Notaro & Michalos

[57] ABSTRACT

An apparatus and method for reducing synchronous speed variations in an electric motor having a rotating shaft, comprises a speed transducer for generating a continuous analog speed signal corresponding to the speed of the motor shaft including its synchronous and asynchronous speed variations. A trigger signal is generated each time the shaft rotates through a reference position and is used in conjunction with the speed signal in a fast Fourier transform analyzer to resolve the analog signal into a synchronous time averaged signal which varies with the synchronous speed variations but which eliminates the asynchronous speed variations. An arbitrary function generator is connected to the analyzer for generating an antiwave pattern having a frequency phase and amplitude relative to the waveform from the analyzer. The function generator is connected to a motor controller and superimposes the antiwave pattern onto a control signal internal to the controller which is thereafter applied to the motor. This reduces or eliminates the synchronous speed variations in the rotation of the motor shaft.

10 Claims, 3 Drawing Sheets

ELECTRIC MOTOR DRIVER CONTROL

FIELD AND BACKGROUND OF THE INVENTION

The present invention relates in general to electric motor controls, and in particular to a new and useful apparatus and method of controlling the speed of an electric motor in a manner which avoids synchronous speed variations.

U.S. Pat. No. 4,527,101 discloses an apparatus for measuring the speed of an electric motor which performs a fast Fourier transform analysis on variations in current being supplied to an electric motor. Current variations are measured as voltage changes over a resistor and the signal is filtered to remove frequencies which are not related to the motor speed, such as the power supply frequency, and to amplify the signal before it is supplied to an A/D to be processed as a digital signal within a microprocessor. The microprocessor utilizes a synchronizing pulse generated by the motor and supplied by a sync detector to the microprocessor. A fast Fourier transform is performed on the digital values and produces an amplitude spectrum with the maximum spectral component being taken as the speed of the motor. This speed measurement is then utilized by a controller to feed a gate signal CTRL back to a Thyristor that controls the power supply to the motor. The synchronization signal of this reference is the zero crossing of the AC power waveform. Actual variations in motor shaft rotation may exist which are not reflected in the zero crossing. There is also no teaching of synchronous time averaging (STA) to remove the random fluctuations from the signal, and the subsequent generation of an antiwave which is applied to the controller for compensating for the speed fluctuations as in the present invention.

U.S. Pat. No. 4,739,230 discloses an anti-hunting motor controller which determines the rotational speed of a motor based on the rotational position of its shaft or equivalent, in a rotational sensor. A phase comparitor is then utilized to determine whether the speed must be increased or decreased. The controller includes a plurality of different patterns which can be selected for controlling the motor speed in the most advantageous manner.

U.S. Pat. No. 3,896,356 addresses the problem of damping oscillations in the output speed of a motor. Either the voltage or synchronous frequency being applied to the motor is responsive to motor performance. PID techniques are utilized in the feedback loop.

None of these references uses fast Fourier analysis and synchronous time averaging to predict future periodic perturbations and construct an antiwave which is applied to the motor controller, as in the present invention.

Synchronous time averaging has been used to measure vibrations in the rolls of a paper machine to detect undesirable vibrations in the rolls which degrade the paper quality. See "Low-Frequency Vibration Analysis of Paper Machine Presses Using Displacement Transducers and the Synchronous Time-Averaging Method", Y. P. Gagnom, Jul. 1987, *Tappi Journal*. Information obtained using synchronous time averaging was utilized in this reference to locate defective rolls for replacement.

Fast Fourier transform analysis (FFTA) has been used to analyze vibrations in a variety of fields, including to identify defects in gears in a gearbox. See, for example "Vibration Analysis Pinpoints Gear Defects", E. A. Page, et al., *Power Transmission Design*, March 1989. Despite the existence of a variety of analysis and control techniques, including STA and FFTA, major problems remain in achieving the accurate constant speed control of electric motors. This includes the use of built in error in systems which asynchronously wait for actual errors to occur and require a hunting period before the error is compensated.

Noise compensation technology is also known which seeks to reduce noise having periodic characteristics such as the noise of fans, machinery, helicopter rotors and the like. For this purpose, an out of phase antiwave is generated and played through amplifiers and speakers.

SUMMARY OF THE INVENTION

The present invention comprises a control apparatus and strategy for an electric motor which utilizes an accurate speed measurement, for example from a tachometer, in conjunction with a trigger signal indicating a reference position for the shaft of the motor. These signals are used in a fast Fourier transform analyzer to produce a synchronous time averaged waveform which includes periodic speed fluctuations and which is substantially free of random asynchronous noise. The speed fluctuation information is then applied to an arbitrary function generator which produces an antiwave that is then superimposed on a PID or other conventional feedback loop of a motor controller to compensate for, and reduce or eliminate the periodic fluctuations.

The present invention differs from the prior art by *anticipating* future speed variations of the motor and taking measures to compensate for the speed variations before they occur. This is contrasted to the conventional approach which waits for a speed variation or error and then tries to correct that error using feedback signals based on proportional and/or integral and/or derivative manipulations of the error.

Accordingly, an object of the present invention is to provide an apparatus for reducing synchronous speed variations in an electric motor having a rotating moving motor member, comprising: speed transducer means operatively connected to the motor for generating a continuous analog speed signal which varies with synchronous and asynchronous speed variations in the movement of the motor member; trigger means operatively connected to the motor for generating a trigger signal each time the motor member passes a reference position during its cyclical movement; analysis means connected to said speed transducer means and to said trigger means for receiving said speed and trigger signals and for performing a synchronous time averaging of the speed signal to generate a perturbation waveform pattern having at least one periodic component with a frequency, an amplitude and phase corresponding to the synchronous speed variations and eliminating the asynchronous speed variations; programmable wave generator means operatively connected to said analysis means for receiving said waveform pattern and for generating a control wave which is substantially opposite to the perturbation pattern, the control wave having the same frequency, as the perturbation waveform pattern and an amplitude the phase being mostly opposite to the phase of the waveform pattern and motor drive modifying means connected between the motor and said programmable wave generator means for modifying the movement of the motor member according to the control wave to reduce the synchronous speed variations of the electric motor.

A further object of the present invention is to provide a method for reducing synchronous speed variations in an electric motor.

A still further object of the present invention is to provide a method and apparatus of improving the control of electric motors, which is relatively simple in design and effective in avoiding a variety of synchronous speed variations.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
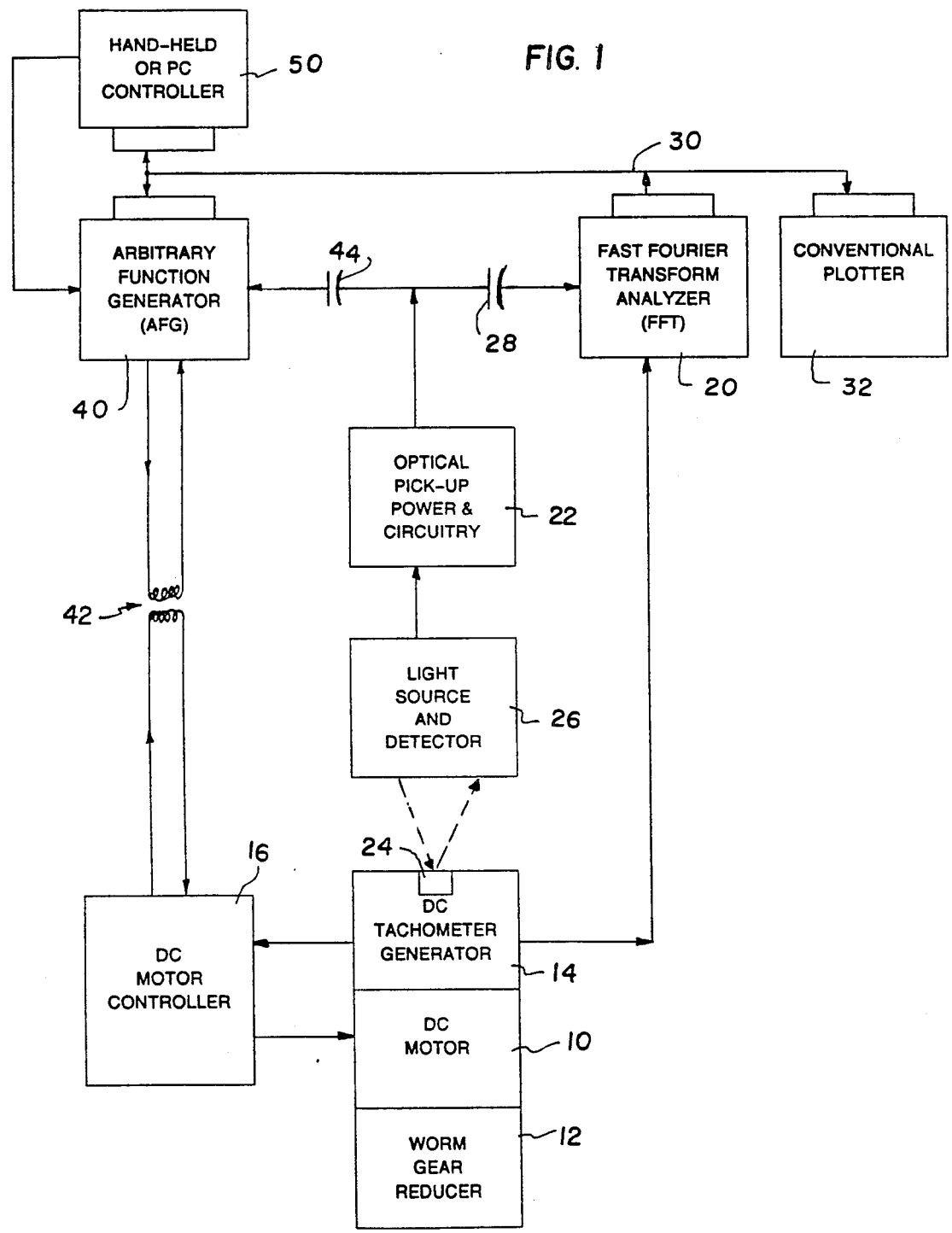
FIG. 1 is a block diagram illustrating the apparatus of the present invention.

Referring to the drawings in particular, the invention in FIG. 1 comprises an apparatus for reducing synchronous speed variations in an electric motor 10 having a cyclically moving motor member, for example, a rotating shaft connected at one end to a load, such as a worm gear reducer 12, and at its opposite end to a DC tachometer generator 14.

A DC motor controller 16, of conventional design incorporating proportional (P), integral (I) and/or derivative (D) control loops, is connected to the motor 10 for powering the motor to achieve as constant a rotational speed as possible, with feedback provided to the controller from the tachometer 14.

Despite conventional attempts to provide smooth continuous and constant rotation speed for electric motors, speed variations or perturbations still occur. This results in poor product quality, scrap, breakage, damage and in general, poor performance due to speed variations in the electric motors.

Figure 2:
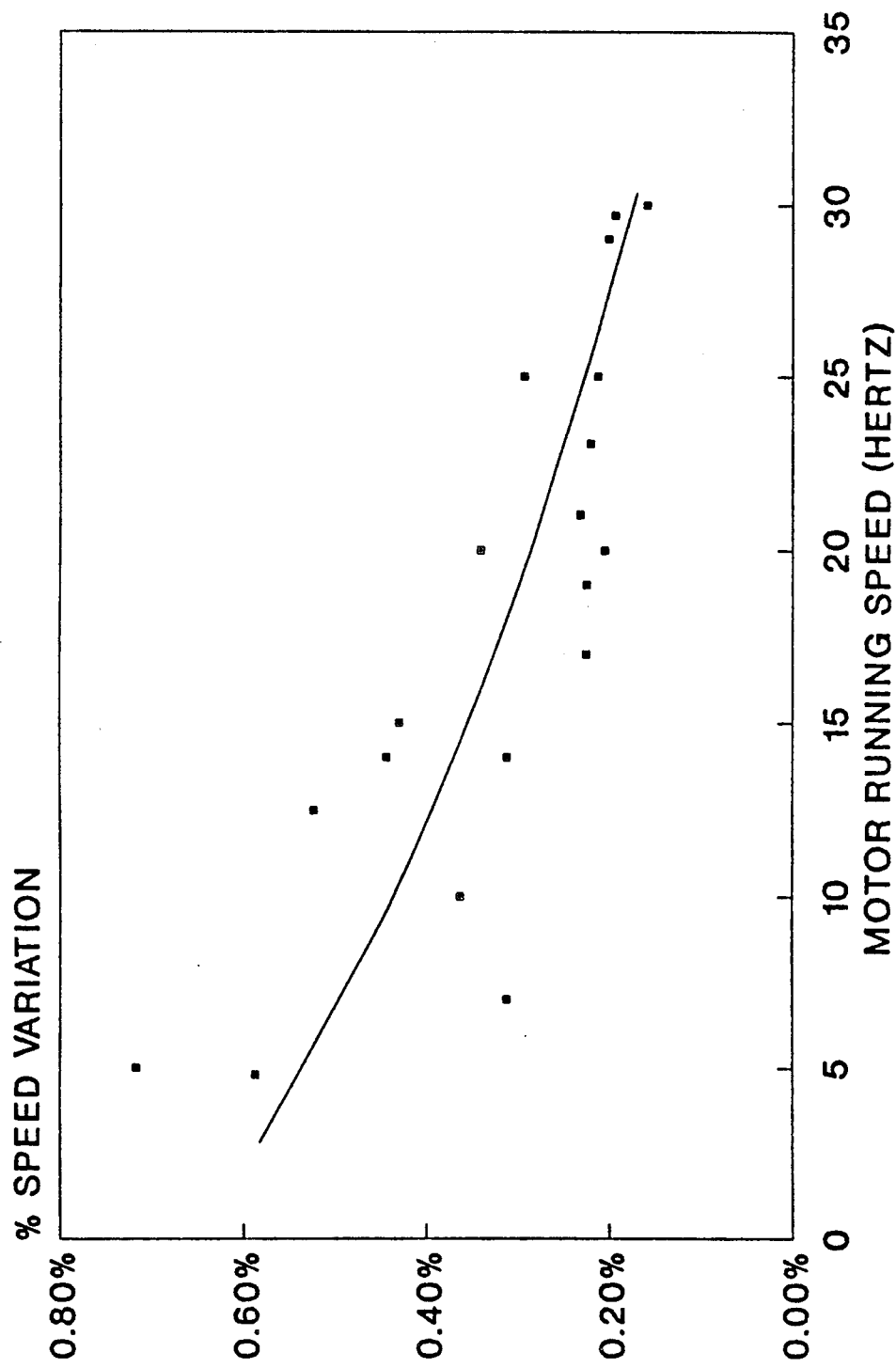
FIG. 2 is a graph plotting percentage of speed variation against motor running speed.

The inventor has observed that larger speed variations occur at lower rather than higher motor speeds. FIG. 2 illustrates speed variations of up to 0.60% at a motor running speed of 5 Hz. Variations drop to approximately 0.20% at 30 Hz. Asynchronous and synchronous variations are illustrated in FIG. 2 and asynchronous variations are not corrected by the present invention. The present invention has, however been found to be effective in reducing or eliminating synchronous speed variations.

To further understand the present invention, it is useful to visualize synchronous speed variations in the following manner:

A DC tach-generator turning at a constant rotational speed should put out a pure DC signal. If there is some oscillation in speed (the tach-generator slows down, speeds up, slows down, speeds up, etc.) then there will be an AC signal sitting on top of the DC signal. The percent speed variation shown in FIG. 2 is the root mean square (rms) AC voltage component divided by the DC voltage present.

When the term "Total AC Ripple" is used, this is the rms AC voltage over the entire measurement width, usually 0-200 Hz. Thus the *Total AC Ripple percent speed variation* is the AC rms voltage over 0-200 Hz divided by the DC voltage. In a similar fashion "*One Times Motor AC Ripple*" percent speed variation is the rms AC voltage at the singular rotational frequency of the motor divided by the DC voltage.

Frequency, phase angle and amplitude can affect the speed variation improvement.

According to the present invention, and as verified by actual tests, the Total AC Ripple has been reduced by 40% and the One Times Motor AC Ripple has been reduced by 60%, as compared to a base case without the invention.

Returning to FIG. 1, the present invention comprises three independent functional blocks. The first block is the drive itself and includes motor 10, the load 12, the tachometer 14 and the controller 16. Examples of each of these components which are commercially available are as follows:

DC MOTOR CONTROLLER (16)

Emerson Electric
Grand Island, New York
Electrostat 2600 RG
Part Number 2600-8000
Single Phase 60 Cycle 110 Volt
Four Quadrant Operation

DC MOTOR (10)

Emerson Electric
Grand Island, N.Y.
1 Horsepower, Permanent Magnet
Part Number 3156-414
Model 5BPB 56 SAA 23B
1725 Revolution Per Minute (RPM)
90 Volt Armature, Single Phase

DC TACHOMETER GENERATOR (14)

General Electric
Model 5PY 59 JY 84
50.4 volts DC per 100 RPM

WORM GEAR REDUCER (12)

B & B Motor and Control Corporation
Long Island City, N.Y.
Morse 50 to 1 Single Reducer Worm Gear
C-56 Frame, 0.18 Horsepower, 1750 RPM The DC motor controller (16) is configured for closed loop four quadrant operation. The closed loop enables the best control method possible for this particular drive controller. Four quadrant refers to the ability of this drive controller to operate with the motor turning in either the clockwise or counterclockwise directions as well as to control in either the "regenerative" or "motoring" mode. A motor is said to be regenerating when the load on the motor exceeds the motors speed which in turn causes it to go faster and the motor acts as a brake by generating (regenerating) electricity. In the motoring mode, the motor is consuming power under load. Four quadrant operation can be important to the present invention by allowing an antiwave, which is generated according to the invention, to both accelerate and decelerate the motor as the need arises. If the motor is going too fast, the antiwave will send a command for it to slow down by asking the motor to act as a brake and regenerate electricity. If the drive is not regenerative, it will only be able to speed up the motor.

The worm gear 12 is used to apply a load to the motor when it is running. It is bolted to one end of the motor. The DC tachometer generator is bolted to the other end of the motor. The motor controller takes incoming 110 volt 60 cycle AC power; rectifies it to DC; sends it out to the motor; which causes the motor to turn; which causes the tachometer generator to generate a DC voltage that will be proportional to its rotational speed; which is fed back to the controller; which compares the tach generator's voltage to a set point.

If the signal from the tach generator is lower than the set point, the motor is turning too slowly and the controller will increase the DC voltage to the motor which will make it speed up. If the tach generator voltage is too high compared to the set point, the motor is turning too fast and the controller will decrease the DC voltage to the motor causing it to slow down. In this manner, the drive will always be hunting for the set point which causes it to overshoot and undershoot the target set point by some amount. The PID values that are set in the controller are used to tune the drive dynamics to determine the "crispness" of the drive, the rate at which changes and corrections are implemented, and the amount of over shoot and undershoot that occurs.

The second independent block comprises analysis means which analyses the speed variations or perturbations for the rotating motor shaft and, in the embodiment illustrated, is exemplified by a fast Fourier transform analyzer or FFT 20. FFT 20 is operated in a synchronous time mode with an optical pickup 22 which supplies a trigger pulse or signal to one input of the FFT 20. This signal initiates synchronous time averaging of a continuous analog signal from tachometer 14 which contains both synchronous and asynchronous speed variations in the movement of the motor shaft. To generate the trigger signal, a light source and detector 26 is utilized which shines a light beam on the rotating shaft or part of tachometer 14 and receives a reflected light beam each time the shaft rotates into an established reference position.

Retroreflective tape 24 is applied by adhering it to the rotating part of the tachometer shaft. It can be applied to a cooling fan blade on the tachometer or the output shaft of the motor. One need not even use retroreflective tape. All that is necessary, is for a single trigger pulse to be generated for each revolution of the motor. The pulse must be synchronized in position relative to the shaft of the motor.

The optical pickup circuitry 22 converts the detectors signal from detector 26 into a pulse that will become the trigger output.

A capacitor 28 is used to AC couple the output trigger pulse to the input of the FFT. This isolation is needed to prevent impedance mismatches between pieces of electronic equipment from "pulling down" or overloading amplifiers in the equipment.

Figure 3:
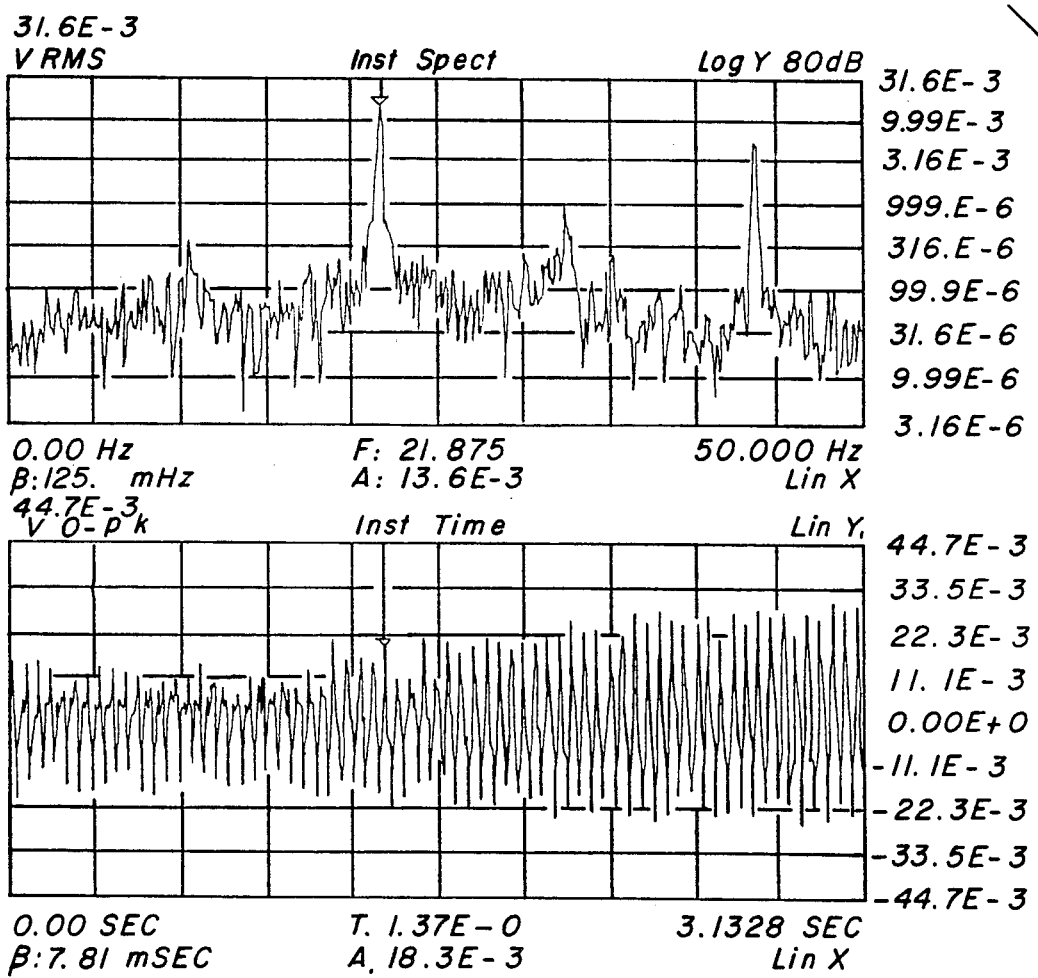
FIG. 3 is a pair of graphs plotting relative amplitude against time in the lower graph and an FFT of the lower graph is shown in the upper graph plotting relative amplitude against frequency.

FFT 20 is basically a large filter box with programmable ranges. For most of the experimentation which verified the effectiveness of the invention, the 0-50, 0-100 or 0-200 Hz ranges were observed. The FFT has about 400 programmable filters. Thus each cell has individual filters of width 50/400, 100/400, and 200/400 Hz, respectively. FFT 20 takes the continuous time domain AC signal from tachometer 14 and converts it into a summation of frequencies or periodic components. It quantifies and identifies the amplitudes of each frequency present in the signal. In the time domain, the signal can be very noisy and look rather random. This is illustrated in the bottom graph of FIG. 3. The FFT converts the time domain signal into the frequency domain and identifies how much of each frequency interval is present. An example of the frequency domain signal is illustrated in the top graph of FIG. 3.

Synchronous time averaging (STA) is very important for the successful application of this invention. It is a well known and established technique in the application and use of FFT's. STA permits the random fluctuations to be averaged out and thus removed from the signal. Only that portion of the incoming signal that is consistently present relative to the trigger will survive and still be present in the FFT's frequency domain output 30.

The FFT is used to measure, quantify, and identify the fluctuating portion of the drive system that is consistent and synchronous to the position of the motor shaft. It is this portion of the signal, since it is always there and always occurring in the same fashion relative to the shaft, that can be anticipated and corrected with an antiwave. The FFT and optical pickup are only used to measure the drive variation.

A plotter 32 is also used to visualize the waveform pattern and is connected to the FFT output 30.

Examples of commercially available equipment used as part of the analysis means of the present invention are as follows:

FAST FOURIER TRANSFORM ANALYZER (20)

Rockland Scientific
Princeton, N.J.
2 Channel FFT
Synchronous Time Averaging Capability
AC Coupled; Floating Ground
System 90 Model 9040

OPTICAL PICKUP (22)

Monarch Instruments
Model SPS-5

RETROREFLECTIVE TAPE (24)

3M Corporation
Retroreflective Adhesive Backed Tape

AC ISOLATION CAPACITOR (28 and 44)

Small Brown Capacitor

The third independent block forming the present invention involves the generation of a control wave which is the summation of some or all of the components from the FFT analysis, each component having the same amplitude and phase relative to the periodic components of the waveform. The analog control wave is applied to the controller 16 for eliminating or at least reducing the synchronous time variations which the controller has not removed. The control wave superimposed onto the DC motor controller control signal where the control signal is applied to the DC motor.

The programmable wave generator means of the present invention is exemplified by a wave generator or AFG 40 which receives the FFT output 30 as well as the trigger signal form optical pickup 22, over a second AC coupling capacitor 44. AFG 40, which stands for arbitrary function generator, is programmable and capable of generating a wide variety of wave patterns. As noted in the following, this is a commercially available product.

AFG 40 is operated in conjunction with a hand held or PC controller 50 and applies its antiwave pattern to controller 16 through an isolation transformer 42, used for AC coupling.

Examples of the hardware used for the antiwave generator means are as follows:

ARBITRARY WAVE GENERATOR (40)

LeCroy Corporation
Chestnut Ridge, N.Y.
Model 9112

HAND HELD OR PC CONTROLLER (50)

Hand held unit for above with pushbutton or PC based software called Easywave Version 2.13 for downloading to the AFG over a GPIB interface. Each of the units 50, 40, 20 and 32 has such an interface.

ISOLATION TRANSFORMER AC COUPLE (42)

Radio Shack
Audio Isolation Transformer
Catalogue Number 273-1374
1 to 1 primary to secondary windings
49 ohm primary resistance
60 ohm secondary resistance The AFG 40 is a digital 12-bit resolution signal generator that is capable of creating, editing, modifying, and generating any waveform. The wave can be generated by a mathematical equation or by modifying each and every addressable point in the wave. It then takes the digitally stored waveform and outputs it as an analog output to be used wherever it is needed.

AFG 40 is programmed manually by either a hand held unit 50 that is designed for it or through PC based software that edits, loads, modifies, etc. waves. For experiments involving the present invention, the FFT was run and determined the major components of the synchronous time averaged signal. That wave form was then manually input into the AFG. The AFG also received the trigger signal from the optical pickup so as to be able to register the proper phase of the control wave relative to the motor shaft. AFG 40 was programmed to generate a single sinusoid of a particular phase and amplitude for each trigger input. The analog signal that was generated by the AFG was put through the isolation transformer 42 to prevent an impedance mismatch between the AFG and the DC motor controller 16 from pulling down and hence disabling the motor controller. The transformer coupling permitted the AFG's output signal to be induced into and on top of the existing control loop signal internal to the DC motor controller. The control wave, which can be thought of as an antiwave, was generated by the AFG and added to the controlling signal in the DC motor controller.

Through experimentation, it was found that the amplitude and phase of the antiwave could be altered so as to minimize the speed variation present in the drive.

The hardware identified for use in the preferred embodiment of the invention can be replaced by a wide variety of functionally equivalent devices available from a wide range of vendors. This includes different controllers, motors, feedback elements and load structures.

In addition, although FFT 20 analyzes and generates sine waves only and AFG 40 was used to generate only sine waves, equipment for resolving the continuous analog speed variation in other manners may also be utilized. For example ramp functions may produce a better antiwave. Exponentially weighted waveforms may also be utilized. Other techniques for resolving a signal containing both synchronous and asynchronous components may also be used. The major task of the present invention is to, as far as possible, remove the asynchronous components and, from the synchronous components generate an antiwave which is applied to the motor controller. Instead of a controller, for example, the motor drive modifying means of the present invention may be a mechanical or electrical brake mechanism which periodically reduces the speed of the motor.

By amassing historical information on the synchronous speed variations of the motor, an antiwave can be used to eliminate these variations. Drifting in the variations are also followed in an effective manner by utilizing the continuous analog signal from the motor.

While the specific embodiment of the invention has been shown and described in detail to illustrate the application of the principles of the invention, it will be understood that the invention may be embodied otherwise without departing from such principles.

What is claimed is:

1. An apparatus for reducing synchronous speed variations in an electric motor having a cyclically moving motor member, comprising:

speed transducer means operatively connected to the motor for generating a continuous analog speed signal which varies with synchronous and asynchronous speed variations in the movement of the motor member;

trigger means operatively connected to the motor for generating a trigger signal each time the motor member passes a reference position during its cyclical movement;

analysis means operatively connected to said speed transducer means and to said trigger means for receiving said speed and trigger signals and for performing a synchronous time averaging of the speed signal to generate a perturbation waveform pattern having at least one periodic component with a frequency, an amplitude and phase corresponding to the synchronous speed variations and eliminating the asynchronous speed variations;

programmable wave generator means connected to said analysis means for receiving said waveform pattern and for generating a control wave pattern having the same frequency as the perturbation wave form pattern, an amplitude and substantially opposite phase relative to the perturbation waveform pattern component; and motor drive modifying means connected between the motor and said programmable wave generator means for modifying the movement of the motor member according to the control wave pattern to reduce the synchronous speed variations of the electric motor.

2. An apparatus according to claim 1, wherein said analysis means resolves said synchronous speed variations into a plurality of components each with a frequency, amplitude and phase, said programmable wave generator means comprising a function generator for generating a control wave of each component and for combining all the control waves to form the control wave pattern.

3. An apparatus according to claim 2, wherein said analysis means comprises a fast Fourier transform analyzer.

4. An apparatus according to claim 2, wherein said generator comprises an arbitrary function generator.

5. An apparatus according to claim 1, wherein said motor drive modifying means comprises a motor controller for applying a control signal to the electric motor, said control wave pattern being superimposed on the control signal.

6. An apparatus according to claim 1, wherein the cyclically moving motor member comprises a motor shaft, the speed transducer means comprising a tachometer connected to the motor shaft, said trigger means comprising a mark operatively connected to motor shaft and rotatable with the motor shaft, and optical pickup means for generating the discontinuous signal each time the mark passes the reference position.

7. A method of reducing synchronous speed variations in an electric motor having a cyclically moving motor member, comprising:

generating a continuous analog speed signal which varies with synchronous and asynchronous variations in the movement of the motor member;

generating a trigger signal each time the motor member passes a reference position during its cyclical movement;

using the trigger signal to perform a synchronized time averaging of the continuous analog signal to generate a perturbation waveform pattern having at least one periodic component with a frequency, amplitude and phase corresponding to the synchronous speed variations while eliminating the asynchronous speed variations;

generating a control wave pattern having the same frequency as the perturbation waveform pattern, an amplitude and a substantially opposite phase relative to the waveform pattern component; and modifying the movement of the motor member according to the control wave pattern to reduce the synchronous speed variations.

8. A method according to claim 7, including performing the synchronous time averaging of the continuous analog speed signal by subjecting the continuous analog speed signal to fast Fourier transform analysis to resolve the analog speed signal into a plurality of periodic components.

9. A method according to claim 7, including applying the waveform pattern to an arbitrary function generator for generating the control wave pattern.

10. A method according to claim 9, including connecting a motor controller between the arbitrary function generator and the electric motor for superimposing the control wave pattern on a control signal from the controller to the motor.

* * * * *